United States Patent [19]

Schwartz

[11] 3,794,266
[45] Feb. 26, 1974

[54] BELT STORAGE APPARATUS
[75] Inventor: Saul Schwartz, Troy, Mich.
[73] Assignee: General Motors Corporation, Detroit, Mich.
[22] Filed: Apr. 6, 1972
[21] Appl. No.: 241,700

[52] U.S. Cl. .............................. 242/107.4, 74/576
[51] Int. Cl. ...................... A62b 35/00, B65h 63/04
[58] Field of Search ...... 242/107.4, 107.5 B, 107 R, 242/107.3; 280/150 SB; 297/385, 386, 387, 388; 74/576

[56] References Cited
UNITED STATES PATENTS

| | | | |
|---|---|---|---|
| 3,667,698 | 6/1972 | Fisher | 242/107.4 |
| 3,659,801 | 5/1972 | Romanzi, Jr. | 242/107.4 |
| 3,664,599 | 5/1972 | Partridge | 242/107.4 |
| 3,604,654 | 9/1971 | Stoffel | 242/107.4 |
| 3,412,952 | 11/1968 | Wohlert | 242/107.4 |

Primary Examiner—John W. Huckert
Assistant Examiner—Jon W. Henry
Attorney, Agent, or Firm—Saul Schwartz

[57] ABSTRACT

Belt storage apparatus of the automatic locking type including a belt storage reel disposed on a frame for rotation in a belt extending direction and a belt retracting direction, a ratchet disc rotatable with the reel and including a plurality of circumferentially spaced ratchet teeth, a pawl lever engageable on the teeth to prevent rotation in the belt extending direction, a control plate rotatable as a unit with the reel and having a latch member pivotally supported thereon, a shutter disc equal in diameter to the ratchet disc and freely rotatable on the frame, the shutter disc having a plurality of circumferential surface elements separated by recesses, a lost motion connection between the control plate and the shutter disc limiting angular relative movement therebetween to one position wherein the surface elements bridge the ratchet teeth to close the latter to the pawl lever and another position wherein the recesses expose the ratchet teeth for engagement on the pawl lever, friction generating means retarding rotation of the shutter disc so that the latter always tends to assume the one relative position during reel rotation in the belt retracting direction and the other relative position during reel rotation in the belt extending direction, and a latch actuator disposed on the control plate for transverse bodily shiftable movement in response to reel rotation. As the belt approaches a fully retracted condition the latch actuator engages the latch member and biases the latter toward a latched position engaging a keeper on the shutter disc so that upon subsequent reel rotation in the belt extending direction the shutter disc is blocked out of the other relative position. When the belt is extended to an in-use condition the latch actuator separates from the latch member so that subsequent momentary belt retraction releases the latch member to thereafter permit movement of the shutter disc to the other relative position thereof.

4 Claims, 10 Drawing Figures

PATENTED FEB 26 1974

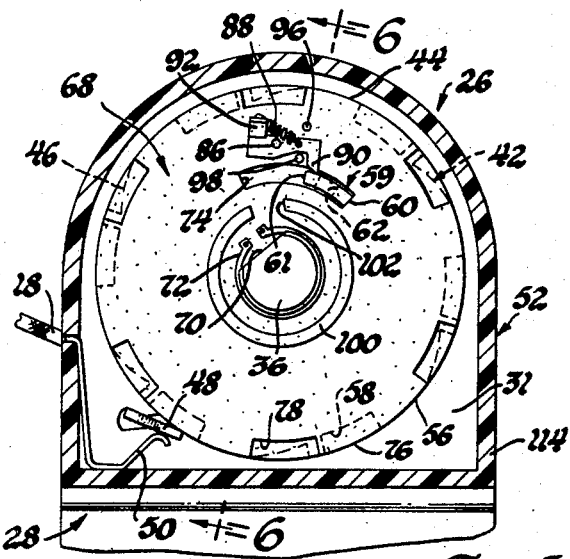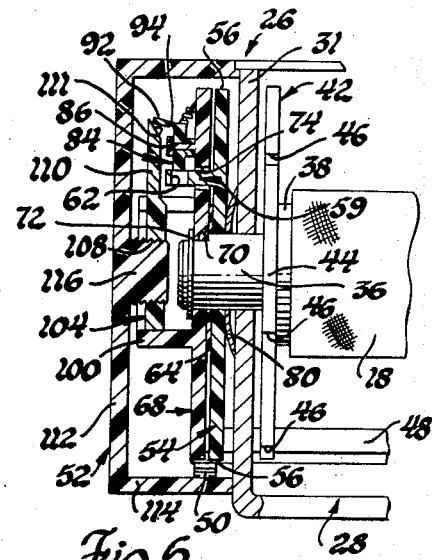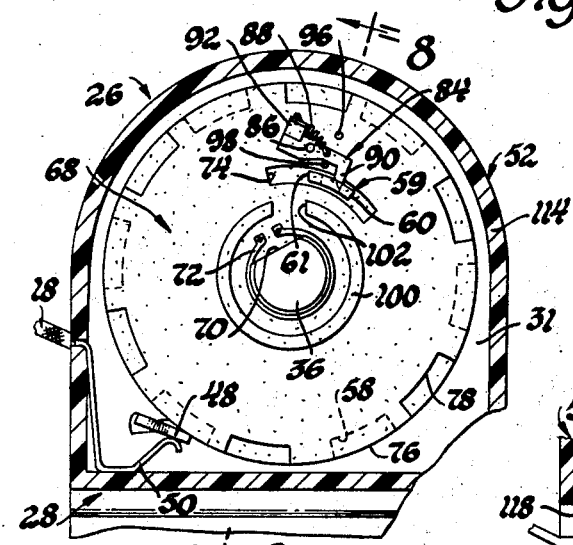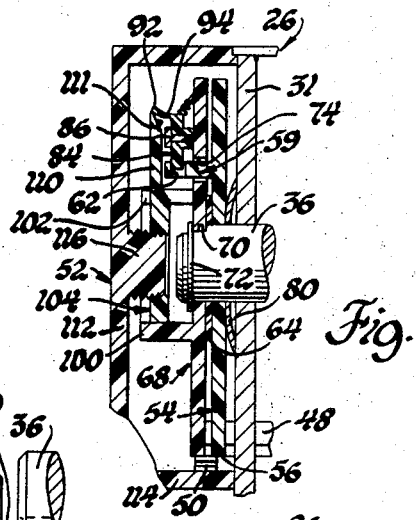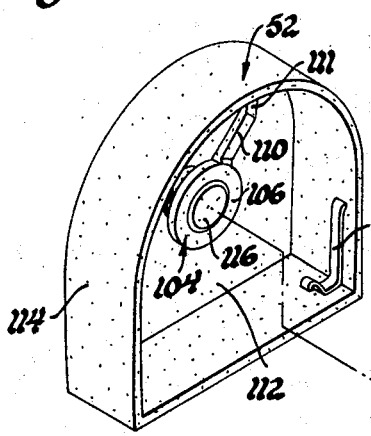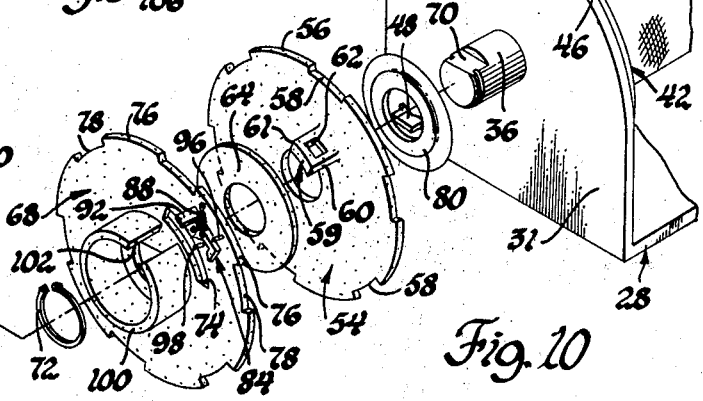

BELT STORAGE APPARATUS

This invention relates generally to belt storage apparatus and more particularly to storage apparatus for restraint belts in automobile type vehicles.

Lap belt type passenger restraints are, of course, common in modern automobiles. To minimize the inconvenience occasioned by unused belts extending across seats, many proposals have been made for belt storage apparatus designed to compactly and automatically store the belt when the latter is not in use. As a further convenience to the passenger, some such devices incorporate automatic locking features which render the restraint belt automatically adjustable. More particularly, in such devices the restraint belt is typically stored in coiled form on a rotatable reel spring biased in a belt retracting direction. When the free end of the coiled belt is grasped and pulled, the belt is extended and the reel rotates in a belt extending direction, the spring maintaining constant or increasing tension on the belt. After the restraint belt has been extended to an in-use condition and connected to a nonadjustable fixed anchor, the restraint belt is released to allow the reel spring to snuggly tighten the belt against the particular passenger. The slight retraction which occurs as the belt snugs against the passenger actuates the automatic locking feature of the device so that further extension of the restraint belt is prevented, the belt then being fully adjusted and operative for effective passenger restraint in the event of sudden deceleration of the vehicle. A belt storage apparatus according to this invention represents a novel improvement over heretofore known apparatus having the performance characteristics recited hereinbefore.

Accordingly, the primary feature of this invention is that it provides a new and improved restraint belt storage apparatus of the automatic locking type. Another feature of this invention is that it provides, in a restraint belt storage apparatus of the type having a belt storage reel lockable against rotation in a belt extending direction by a pawl lever engageable on any one of a plurality of ratchet teeth, a new and improved control arrangement including a shutter disc rotatable with the reel but adapted for angular movement relative thereto into and out of a position closing the ratchet teeth so that with the ratchet teeth closed the pawl lever experiences silent sliding motion over a continuous surface. Yet another feature of this invention resides in the provision of friction generating means between the shutter disc and a fixed frame and in the provision of lost motion connecting means between the reel and the shutter disc, the shutter disc thereby being adapted to close the ratchet teeth whenever the reel rotates in the belt retracting direction for effecting silent retraction and to open the ratchet teeth whenever the reel is rotated in the belt extending direction for permitting locking engagement between the ratchet teeth and the pawl lever. A still further feature of this invention resides in the provision in the control arrangement of a latching mechanism responsive to reel rotation in the belt extending direction from a condition wherein the restraint belt is substantially fully retracted for locking the shutter disc against movement to the ratchet teeth opening position thereby to permit continued rotation of the reel in the belt extending direction, the latching mechanism being further responsive to subsequent momentary rotation of the reel in the belt retracting direction to unlock the shutter disc for normal movement into and out of the ratchet teeth opening position.

These and other features of this invention will be readily apparent from the following specification and from the drawings wherein:

FIG. 1 is a perspective view of a typical automobile type passenger seat structure having associated therewith a lap type restraint belt system and belt storage apparatus according to this invention;

FIG. 2 is an enlarged sectional view taken generally along the plane indicated by lines 2—2 in FIG. 1;

FIG. 3 is a sectional view taken generally along the plane indicated by lines 3—3 in FIG. 2 showing the belt reel locked against extension;

FIG. 4 is similar to FIG. 3 but showing the control arrangement condition corresponding to continuous belt retraction;

FIG. 5 is similar to FIG. 4 but showing the control arrangement condition corresponding to a substantially fully retracted condition of the belt;

FIG. 6 is a sectional view taken generally along the plane indicated by lines 6—6 in FIG. 5;

FIG. 7 is similar to FIG. 5 but showing the control arrangement condition corresponding to continuous extension of the belt from the fully retracted condition thereof;

FIG. 8 is a sectional view taken generally along the plane indicated by lines 8—8 in FIG. 7;

FIG. 9 is an enlarged view of a portion of FIG. 2 showing a modified construction incorporating in the belt storage apparatus according to this invention an electrical switch; and FIG. 10 is an exploded perspective view of the control arrangement for the belt storage apparatus according to this invention.

Figures 1, 2, 3, 4:
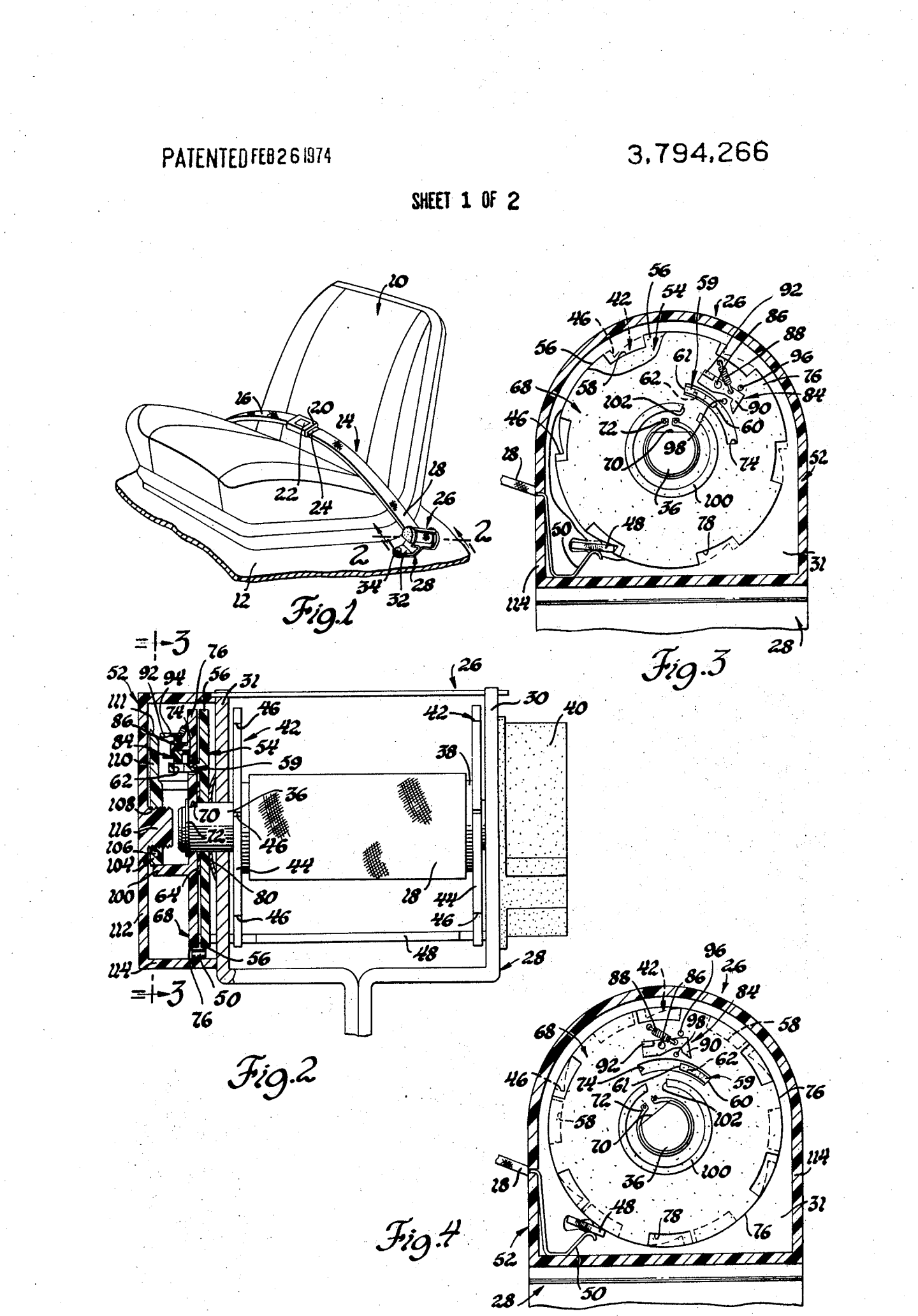

Referring now to FIG. 1 of the drawings, thereshown in perspective view is a typical automobile type passenger seat installation including a seat structure 10 supported on a portion 12 of the vehicle body floor structure through conventional seat adjusters, not shown. In order to restrain a passenger seated on the seat structure 10 in the event of rapid deceleration of the vehicle, there is provided a lap type restraint belt system designated generally 14 including a flexible and inextensible belt element 16 and a similar flexible and inextensible belt element 18. The lower end of the belt element 16, not shown, is adapted for rigid anchorage to the floor portion 12 of the vehicle body, the free end of the belt element 16 having attached thereto a conventional buckle assembly 20 including an actuating button 22. The upper or outboard end of the belt element 18 has rigidly attached thereto a tongue member 24 adapted for locking engagement in the buckle assembly 20. As is conventional, the tongue is releasable from the buckle assembly upon depression of the actuating button 22. The lower or inboard end of the belt element 18 is connected to the floor portion 12 of the vehicle body through a belt storage apparatus according to this invention and designated generally 26, the apparatus 26 hereinafter being referred to as the retractor.

As seen best in FIGS. 1 and 2, the retractor 26 includes a rigid bifurcated frame 28 defining a pair of laterally spaced wall portions 30 and 31 and a lug portion 32, FIG. 1. A bolt 34 projecting through an appropriate aperture in the lug portion 32 is threadedly received in a receptacle on the floor portion 12 thereby to rigidly attach the frame 28 to the vehicle body.

A reel shaft 36 is rotatably journaled in the wall portions 30 and 31 and projects beyond each. A reel 38, FIGS. 2 and 6, is rigidly attached to the shaft 36 between the wall portions 30 and 31 for rotation as a unit with the shaft and has attached thereto by conventional means the lower end of belt element 18. Outboard of the wall portion 30 of the frame, the reel shaft has attached thereto a conventional coil or clock type power spring, not shown, disposed within a housing 40 attached to the frame. The power spring is, of course, anchored on the frame 28 and imparts to the reel shaft a rotary bias tending to effect counterclockwise rotation, FIGS. 3, 4, 5 and 7, of the reel, such rotation of the reel tending to wind the belt element 18 thereabout and being referred to hereinafter as rotation in the belt retracting direction. Conversely, tension of sufficient magnitude exerted on the belt element 18 generally at the tongue member 24 will overcome the bias of the power spring to effect clockwise rotation of the reel 38 and extension or unwinding of the belt element 18 from the reel, such clockwise rotation of the reel being referred to hereinafter as rotation in the belt extending direction.

As seen best in FIG. 2, the reel 38 has rigidly attached thereto at the opposite ends thereof a pair of ratchet discs 42 each defining a circumferential surface 44 having a plurality of ratchet teeth 46 formed therein at predetermined and aligned intervals therealong. A locking bar of pawl lever 48 is supported on the wall portions 30 and 31 of the frame for pivotal movement and extends beyond the wall portion 31. A spring element 50, FIGS. 3, 4, 5, 7 and 10, attached to a cover member 52, to be described in more detail hereinafter, engages the pawl lever 48 to constantly resiliently bias the latter in a counterclockwise direction, FIGS. 3, 4, 5 and 7, into sliding engagement on the circumferential surface 44 of the ratchet discs 42. Accordingly, rotation of the reel in the belt retracting direction is unimpeded by the pawl lever 48 which merely tends to click or ratchet over the teeth 46 while opposite rotation of the reel in the belt extending direction is prevented through engagement of the pawl lever or any one of the ratchet teeth 46.

Referring particularly now to FIGS. 2, 3, 4 and 10, outboard of the wall portion 31 of the frame 28 the reel shaft 36 has freely rotatably disposed thereon a shutter disc 54 substantially equal in diameter to the diameter of the ratchet discs 42, the shutter disc defining a plurality of circumferential surface elements 56 corresponding in number to the number of ratchet teeth on the ratchet discs. The surface elements 56 are separated by a corresponding plurality of recesses 58 slightly longer and slightly deeper than the ratchet teeth 46. As seen best in FIG. 10, a protuberance or flange 59 integral with the shutter disc 54 and having a pair of opposite side edges 60 and 61 projects generally perpendicularly to the place of the disc and has formed therein a latch keeper aperture 62.

An antifriction thrust washer 64 is disposed on the shaft 36 outboard of the shutter disc and outboard of the washer the shaft 36 has attached thereto for unitary rotation therewith a control plate designated generally 68. The control plate is generally in the form of a disc equal in diameter to the diameters of the shutter disc 54 and the ratchet discs 42, the plate 68 being keyed to the shaft 36 by a milled flat 70, FIG. 10, on the latter and retained thereon by a spring retaining ring 72. The control plate 68 includes an arcuate slot 74 adapted to freely receive the flange 59 on the shutter disc 54 and a plurality of circumferential surface elements 76 interrupted by a corresponding plurality of recesses 78 slightly longer and slightly deeper than the ratchet teeth 46, the recesses 78 in the control plate being permanently aligned with corresponding ones of the ratchet teeth on the ratchet discs as shown in FIG. 3.

With the shutter disc and the control plate thus assembled on the reel shaft 36, the slot 74 and the flange 59 define a lost motion connection which permits angular movement of the shutter disc relative to the control plate between a first relative position with side edge 61 engaging the left end of slot 74, FIG. 3, wherein the recesses 58 are aligned or register with the ratchet teeth 46 and the recesses 78 and a second relative position with side edge 60 engaging the right end of slot 74, FIG. 4, wherein the recesses 58 are indexed with respect to the recesses 78 and the ratchet teeth 46. The surface elements 56 on the shutter disc are of sufficient length to bridge corresponding ones of the ratchet teeth when the shutter disc is in the second relative position thereof, FIG. 4.

As seen best in FIGS. 2, 6, 8 and 10, a Bellville type spring 80 is disposed around the reel shaft 36 and bears against the shutter disc 54 and against the wall portion 31 of the frame 28, the spring 80 urging the shutter disc against the antifriction thrust washer 64. The spring 80 functions to generate friction between the shutter disc and the frame 28 so that the shutter disc remains stationary in the absence of a positive driving force exerted thereon. Accordingly, as the reel is rotated in the belt extending direction, the shutter disc remains stationary until the side edge 61 of the flange 59 is engaged by the left end of slot 74 in the control plate, FIG. 3, thus insuring that the shutter disc will always assume the first relative position thereof during rotation of the reel 38 in the belt extending direction. Conversely, the shutter disc remains stationary during rotation of the reel in the belt retracting direction until the side edge 60 of the flange 59 is engaged by the right end of slot 74 in the control plate, FIG. 4, thus insering that the shutter disc will always assume the second relative position thereof during rotation of the reel in the belt retracting direction.

Referring now to FIGS. 2, 3 and 4, it will be seen that the pawl lever 48 extends across the control plate 68, the shutter disc 54, and both of the ratchet discs 46 and, since each is of the same diameter, the pawl lever simultaneously contacts the circumferential surfaces of each. Accordingly, when the reel is rotated in the belt extending direction with the shutter disc in the first relative position thereof, FIG. 3, the recesses 78 and 58 are aligned to expose the ratchet teeth so that as the ratchet discs rotate in the belt extending direction the pawl lever 48 falls into locking engagement against the first available ratchet tooth under the urging of spring 50 thus preventing further rotation of the reel in the belt extending direction. As the reel rotates in the belt retracting direction, however, the shutter disc automatically assumes the second relative position, FIG. 4, as described hereinbefore, with the surface elements 56 spanning the ratchet teeth 46 and also the recesses 78 on the control plate. Thus, there is presented to the pawl lever 48 a continuous circumferential surface made up of the surface elements 56 on the shutter disc and the circumferential surface portions of the ratchet discs located on opposite sides of the ratchet teeth. Accordingly, the pawl lever experiences no pivotal movement as the reel rotates in the belt retracting direction so that the belt is silently retracted. It will, of course, be apparent that the surface elements 76 of the control plate also cooperate with the surface elements 56 of the shutter disc in providing a continuous circumferential surface for the pawl lever and may, therefore, be eliminated if desired.

An automatic latching mechanism is provided in the control arrangement to permit extension of the belt element 18 from a substantially fully retracted condition wherein it is substantially fully wound upon the reel 38 to an in-use condition connected to the belt element 16 through the buckle assembly 20 and the tongue member 24. The latching mechanism includes a latch member 84 pivotally supported on a pin 86 integral with the control plate 68, the latch member being biased for counterclockwise rotation, FIGS. 3, 4, 5 and 7, by a relatively light helical coil spring 88 disposed between the latch member and the control plate. The latch member 84 includes a downturned hook portion 90 and a spring tab 92 projecting generally perpendicularly to the main body portion of the latch member. The spring tab 92 is integral with the main body portion but connected thereto through a reduced material section 84, FIGS. 2, 6 and 8, which functions as an integral or living hinge self-biased to maintain the tab 92 in a generally perpendicular orientation with respect to the main body portion of the latch member but allowing pivotal movement of the tab against a restoring force developed at the reduced material section. The restoring force generated at the reduced material section is dependent upon the material from which the latch member is fabricated and a preferred material for this application is polypropolene. A pair of stop pins 96 and 98 disposed on the control plate limit pivotal movement of the latch member to a latched position, FIG. 7, wherein the latch member is engaged on pin 98 and an unlatched position, FIGS. 3 and 4, wherein the latch member is engaged on pin 96.

As seen best in FIGS. 2, 6, 8 and 10, the latching mechanism further includes a cylindrical flange 100 integral with and projecting generally perpendicularly from the control plate 68 coaxially with the reel shaft 36, the cylindrical flange having a slot 102 extending generally the entire length thereof. A latch actuator 104 having a circular body portion 106 with a threaded bore 108 therethrough and an integral driving dog 110 with a cam surface 111 at the distal end thereof is received within the cylindrical flange 100 with the driving dog 110 projecting through the slot 102. The actuator is thus disposed on the control plate for rotation as a unit therewith and for bodily shiftable movement relative thereto generally perpendicularly to the plane thereof.

Referring now to FIGS. 2, 6, 8 and 10 and describing in further detail the cover member 52, the latter is preferably fabricated of plastic type material by a molding process and includes an end wall 112 having an integral flange portion 114 extending therearound. The end wall 112 has substantially the same configuration as the wall portion 31 of the frame and rigidly attaches to the wall portion by conventional means, not shown. The flange portion 114 is of sufficient depth to permit complete enclosure of the control plate 68 and the shutter disc 54 by the cover member 52. As seen best in FIGS. 2, 6 and 8, the end wall 112 has formed integrally therewith a threaded stud 116 aligned on the axis of the reel shaft 36. The stud 116 is threadedly received in the bore 108 of the latch actuator 104 so that as the latch actuator is rotated by the control plate through the driving dog 110 the actuator is caused simultaneously to undergo bodily shiftable movement perpendicularly to the plane of the control plate.

Describing now a typical operational sequence of the belt storage apparatus according to this invention and assuming that the belt element 18 is substantially fully extended to its in-use condition connected to the belt element 16 through tongue 24 and the buckle assembly 20, FIG. 1, the various elements of the control arrangement assume the positions shown in FIGS. 2 and 3. More particularly, when the belt element 18 is in the in-use condition the shutter disc is in the second relative position thereof with the recesses 58 thereon aligned with the ratchet teeth 46 so that only slight rotation of the reel in the belt extending direction is possible and the latch actuator 104 is disposed substantially at the base of the stud 116 totally remote from the latch member 84 which assumes the unlatched position. When the actuating button 22 is depressed to uncouple the belt element 18 from the belt element 16, the power spring within the housing 40 initiates rotation of the reel 38 in the belt retracting direction thus coiling the belt element 18 about the reel. As the reel begins to rotate in the belt retracting direction, the pawl lever 48 slides up the ramp portion of the ratchet teeth 46 and onto the circumferential surface of the ratchet discs 42. The shutter disc 54, however, remains stationary until the side edge 60 of the flange 59 is engaged by the right end of the slot 74 in the control plate whereafter the shutter disc rotates as a unit with the reel in the second relative position thereof closing the ratchet teeth 46. Movement of the shutter disc to the second relative position thereof occurs after the pawl lever reaches the circumferential surface of the ratchet discs but before the next successive pair of ratchet teeth reach the lever so that continued rotation of the reel in the belt retracting direction is virtually completely silent.

Referring now to the latch actuator 104, as the reel rotates in the belt retracting direction, the threads on the stud 116 cause the actuator to undergo bodily shiftable movement toward the control plate from the position shown in FIG. 2 remote from the latch member 84. As the belt approaches the fully retracted condition; that is, when the tongue member 24 comes within approximately 6 inches of the retractor 26, the cam surface 111 engages the distl end of the spring tab 92 and exerts thereon a generally upwardly directed force. The upwardly directed force effects clockwise pivotal movement of the latch member 84 from the unlatched position thereof toward the latched position. The latch member, however, is prevented from achieving the fully latched position by engagement between the tip of hook portion 90 and the upper surface of flange 59 which surface underlies the hook portion in the second relative position of the shutter disc, FIG. 5. The force exerted by the cam surface 111 is, of course, sufficient to overcome the force exerted on the latch member by the spring 88 and subsequent to engagement between the hook portion 90 and the flange 59 continued bodily shiftable movement of the latch actuator toward the control plate corresponding to continued rotation of the reel in the belt receiving direction effects bending of the spring tab about the living hinge 94 so that the latch member is continuously resiliently biased against the upper surface of the flange. Accordingly, when the belt element 18 finally reaches the fully retracted condition, the shutter disc is in the second relative position thereof and the latch member 84 is biased against the flange 59 adjacent the latch keeper aperture 62, FIG. 5.

When it is desired to thereafter extend the belt element 18 to the in-use condition, FIG. 1, the tongue member 24 projecting outwardly from the retractor is grasped and pulled to effect rotation of the reel in the belt extending direction. As the reel and the control plate 68 begin rotation in the belt extending direction, the shutter disc remains stationary causing the latch member 84 to move rightwardly over the flange 59 on the shutter disc from the position shown in FIG. 5. The tip of hook portion 90 remains in contact with the upper surface of the flange under the urging of spring tab 92 until the keeper aperture 62 registers therewith whereupon the latch member is rotated to the latched position thereof and the hook portion projected into the keeper aperture, FIG. 7. The hook portion then engages the right edge of the keeper aperture to physically block the shutter disc from achieving the first relative position thereof, the shutter disc then being driven as a unit with the control plate in the belt extending direction through the pin 86 and the latch member and maintained by the latter in a relative position intermediate the first and second relative positions, FIG. 7. The intermediate position of the shutter disc is sufficiently removed from the first relative position to permit the surface elements 56 to maintain the ratchet teeth 46 closed so that a continuous circumferential surface is presented to the pawl lever 48 and continued rotation of the reel in the extending direction is permitted.

Simultaneously, as the reel rotates in the belt extending direction, the latch actuator 104 undergoes bodily shiftable movement away from the control plate. As the belt element 18 is extended beyond the substantially fully retracted condition referred to hereinbefore, the cam surface 11 separates from the spring tab 92. The latch member remains in the latched position, however, since driving force is being transmitted therethrough to the frictionally retarded shutter disc. Consequently, the shutter disc remains in the intermediate position thereof as long as tension is generally continuously maintained on the belt element 18.

When the belt element 18 is extended out sufficiently for effecting engagement between the buckle assembly 20 and the tongue 24, the operator releases the connected belt elements allowing the power spring in the housing 40 to retract the belt element 18 a relatively slight amount sufficient to confortably engage the torso of the passenger seated on the seat structure 10. The momentary or slight retraction of the belt element 18 is accomplished by momentary rotation of the reel in the belt retracting direction which, of course, causes the control plate 68 to rotate counterclockwise, FIG. 7, relative to the shutter disc 54. As the control plate so rotates, the hook portion 90 separates from the right edge of the keeper aperture 62 thus terminating the driving relation between the latch member and the shutter disc. Virtually at the instant such termination occurs, the spring 88 effects counterclockwise pivotal movement of the latch member 84 from the latched position to the unlatched position against stop 96. With the latch member 84 in the unlatched position, any subsequent rotation of the reel in the belt extending direction is accompanied by relative movement of the shutter disc to the first relative position thereof, FIG. 3, wherein the ratchet teeth 46 are exposed for engagement on the locking bar 48 so that the belt element 18 is locked against further extension and thus, in combination with belt element 16, will restrain the passenger in the event of sudden vehicle deceleration.

It will, of course, be apparent to those skilled in the art that the instant at which the locking mechanism becomes responsive to momentary retraction of the belt for preventing further belt extension is the instant the cam surface 111 separates from the spring tab 92 on the latch member 84. Further, since the belt element 18 is of finite length, the reel undergoes a finite number of revolutions between the fully retracted and fully extended conditions of the belt element. Accordingly, the instant of separation between the spring tab and the cam surface can be very accurately correlated with the degree of extension of the belt element from the fully retracted condition merely by precisely locating the position of the latch actuator on the stud 116 when the belt element is fully retracted. Those skilled in the art will also appreciate that such position could easily be made adjustable by constructing the cover member 52 such that the stud 116 is both rotatable and selectively lockable against rotation.

Referring particularly now to FIG. 9, there may be occasion to incorporate into the control arrangement an electrical switch adapted to complete an electrical circuit when the belt is substantially fully retracted, as for example in a warning system wherein an audible and visual signal is triggered when the ignition circuit of the vehicle is energized and a passenger is seated on the seat structure but has not extended the belt beyond the substantially fully retracted condition. In FIG. 9 there is shown such a switch installation embodied in a slightly modified cover member 52'. The cover member 52' includes an integral threaded stud 116' having a bore 118 therethrough. At the end of the stud the latter is notched as at 120 to receive an electrically conductive pre-bent contact 122 fastened within the stud and projecting outward from the bore 118 for connection to the warning circuit elements. The contact 122 overlies the end of reel shaft 36 which is grounded to the vehicle body through the frame member 28 and the bolt 34. As the reel rotates in the belt retracting direction, the latch actuator 104 is bodily shifted toward the control plate and the end of the reel shaft 36. At a predetermined position along the length of the threaded stud 104 corresponding to the instant of contact or separation between the spring tab 92 and the cam surface 111, the right side surface of the circular body portion 106 of the actuator engages a bent portion 124 of the contact 122 whereupon continued rotation of the reel in the belt retracting direction causes the actuator 104 to bent the contact into sliding engagement on the reel shaft 36 thereby electrically grounding the warning circuit.

Having thus described the invention, what is claimed is:

1. In a pawl and ratchet mechanism including a reel element for storing in coiled form in a fully wound condition a tensile element of finite length, said reel element being rotatable from a position corresponding to the fully wound condition of said tensile element in an extending direction for uncoiling said tensile element and through an equal number of revolutions in a retracting direction for restoring said tensile element to the fully wound condition, spring means biasing said reel element in the retracting direction, a ratchet element having a plurality of tooth segments, said ratchet element being rotatable as a unit with said reel element, a pawl engageable on said tooth segments for preventing rotation of said reel element in the extending direction, spring means biasing said pawl for engagement on said tooth segments, a shutter element rotatable as a unit with said ratchet element and relative to the latter between a first position and a second position, means associated with said shutter element for locating the latter in the first position during rotation of said reel element in the extending direction and in the second position during rotation of said reel element in the retracting direction, and means on said shutter element engageable on said pawl for preventing engagement of said pawl on said tooth segments when said shutter element is in the second position relative to said ratchet element, said shutter element in the first position thereof permitting engagement of said pawl on said tooth segments for preventing rotation of said reel element in the extending direction, the combination comprising, latch means associated with said reel element and with said shutter element movable between a latched position preventing movement of said shutter element to the first position relative to said reel element and an unlatched position permitting movement of said shutter element to the first position, latch operating means associated with said latch means and operative to effect movement of said latch means from the unlatched position to the latched position in response to sequential rotation of said reel element first in the retracting direction to the position corresponding to substantially the fully wound condition of said tensile element and then in the extending direction so that said shutter element is prevented from achieving the first position relative to said reel element during succeeding revolutions of the latter in the extending direction, and unlatching means associated with said latch means operative to move said latch means from the latched to the unlatched position in response to rotation of said reel element in the retracting direction after said tensile element has been uncoiled beyond substantially the fully wound condition.

2. In a pawl and ratchet mechanism including a reel element for storing in coiled form in a fully wound condition a tensile element of finite length, said reel element being rotatable from a position corresponding to the fully wound condition of said tensile element in an extending direction for uncoiling said tensile element and through an equal number of revolutions in a retracting direction for restoring said tensile element to the fully wound condition, spring means biasing said reel element in the retracting direction, a ratchet element having a plurality of tooth segments, said ratchet element being rotatable as a unit with said reel element, a pawl engageable on said teeth segments for preventing rotation of said reel element in the extending direction, spring means biasing said pawl for engagement on said tooth segments, a shutter element rotatable as a unit with said ratchet element and relative to the latter between a first position and a second position, means associated with said shutter element for locating the latter in the first position during rotation of said reel element in the extending direction and in the second position during rotation of said reel element in the retracting direction, and means on said shutter element engageable on said pawl for preventing engagement of said pawl on said tooth segments when said shutter element is in the second position relative to said ratchet element, said shutter element in the first position thereof permitting engagement of said pawl on said tooth segments for preventing rotation of said reel element in the extending direction, the combination comprising, a latch member, means connecting said latch member to said reel element for rotation as a unit therewith and for movement relative thereto between a latched position and an unlatched position, means on said shutter element defining a latch keeper, said latch member in the latched position thereof engaging said keeper thereby to prevent movement of said shutter element to the first position and in the unlatched position being remote from said keeper thereby to permit movement of said shutter element to the first position, latch operating means associated with said latch member and operative to effect movement of said latch member from the unlatched position to the latched position in response to sequential rotation of said reel element first in the retracting direction to the position corresponding to substantially the fully wound condition of said tensile element and then in the extending direction so that said shutter element is prevented from achieving the first position relative to said reel element during succeeding revolutions of the latter in the extending direction, and unlatching means associated with said latch member operative to move the latter from the latched to the unlatched position in response to rotation of said reel element in the retracting direction after said tensile element has been uncoiled beyond substantially the fully wound condition.

3. In a pawl and ratchet mechanism including a frame, a reel element having an integral ratchet disc with a plurality of tooth segments thereon, said reel element being adapted for storing in coiled form in a fully wound condition a tensile element of finite length and being supported on said frame for rotation from a position corresponding to the fully wound condition of said tensile element in an extending direction for uncoiling said tensile element and through an equal number of revolutions in a retracting direction for restoring said tensile element to the fully wound condition, spring means biasing said reel element for rotation in the retracting direction, a pawl supported on said frame for engagement on said tooth segments for preventing rotation of said reel element in the extending direction, and spring means biasing said pawl for engagement on said tooth segments, the combination comprising, a control element supported on said frame for rotation as a unit with said reel element, a shutter element supported on said frame for rotation as a unit with said control element and for rotation relative to the latter between a first position and a second position, means associated with said shutter element operative to locate the latter in the first position during rotation of said reel element in the extending direction and in the second position during rotation of said reel element in the retracting direction, means on said shutter element engageable on said pawl in the second position of said shutter element for preventing engagement of said pawl on said tooth segments, said shutter element in the first position thereof permitting engagement of said pawl on said tooth segments for preventing rotation of said reel element in the extending direction, a latch member disposed on said control element for movement relative to the latter between a latched position and an unlatched position, means on said shutter element defining a latch keeper, said latch member in the latched position thereof engaging said keeper thereby to prevent movement of said shutter element to the first position and in the unlatched position being remote from said keeper thereby to permit movement of said shutter element to the first position, an actuator element disposed on said control element for movement between an operative position engaging said latch member and locating the latter in the latched position and an inoperative position remote from said latch member, means disposed between said actuator element and said reel element responsive to rotation of the latter in the retracting direction for moving said actuator element from the inoperative to the operative position thereof when said tensile element achieves substantially the fully wound condition so that said shutter element is prevented from achieving the first position thereof during the next succeeding rotations of said reel element in the extending direction, and unlatching means disposed between said latch member and said control element for moving said latch member to the unlatched position in response to rotation of said reel element in the retracting direction after said tensile element has been uncoiled beyond the fully wound condition.

4. In a pawl and ratchet mechanism including a frame, a reel element having an integral ratchet disc defining a circumferential surface portion with a plurality of tooth segments therein, said reel element being adapted for storing in coiled form in a fully wound condition a tensile element of finite length and being supported on said frame for rotation from a position corresponding to the fully wound condition of said tensile element in an extending direction for uncoiling said tensile element and through an equal number of revolutions in a retracting direction for restoring said tensile element to the fully wound condition, spring means biasing said reel element for rotation in the retracting direction, a pawl supported on said frame for engagement on said tooth segments for preventing rotation of said reel element in the extending direction, and spring means biasing said pawl for engagement on said tooth segments, the combination comprising, a control element supported on said frame for rotation as a unit with said reel element and including an arcuate slot, a shutter disc equal in diameter to said ratchet disc and including a plurality of circumferential surface elements corresponding in number to the number of said ratchet tooth segments and a flange adapted for reception in said arcuate slot, means rotatably supporting said shutter disc on said frame with said flange projecting through said arcuate slot so that said shutter disc is rotatable as a unit with said control element and relative to the latter between a first position and a second position as defined by engagement between said flange and opposite ends of said arcuate slot, friction means disposed between said frame and said shutter disc operative to retard rotation of the latter, said friction means cooperating with said flange and with said arcuate slot in locating said shutter disc in the first position during rotation of said reel element in the extending direction and in the second position during rotation of said reel in the retracting direction, said circumferential surface elements being engageable on said pawl in the second position of said shutter disc for preventing engagement of said pawl on corresponding ones of said tooth segments and remote from said pawl in the first position of said shutter disc thereby to permit engagement of said pawl on said tooth segments, a latch member disposed on said control element for movement relative thereto between a latched position and an unlatched position, return spring means biasing said latch member toward the unlatched position, means on said flange defining a latch keeper, said latch member in the latched position thereof engaging said keeper thereby to prevent movement of said shutter disc to the first position and in the unlatched position being remote from said keeper thereby to permit movement of said shutter disc to the first position, an actuator element disposed on said control element for rotation as a unit therewith and for bodily shiftable movement relative thereto between an inoperative position and an operative position, means on said actuator element engaging said latch member in the operative position of said actuator element for moving said latch member to the latched position thereof, said actuator element in the inoperative position being remote from said latch member, and means disposed between said frame and said actuator element for effecting bodily shiftable movement of the latter from the inoperative position in response to rotation of said reel in the retracting direction to a position corresponding to substantially the fully wound condition of said tensile element so that said shutter element is prevented from achieving the first position thereof during the next succeeding revolutions of said reel element in the extending direction, said return spring means being operative to move said latch member to the unlatched position thereof in response to rotation of said reel in the retracting direction after said tensile element has been extended beyond substantially the fully retracted condition.

* * * * *